Feb. 18, 1947.  R. W. AUXIER ET AL  2,416,137

BAG-MOLDING

Filed Nov. 13, 1943

WITNESSES:
C. J. Weller.

INVENTORS
Robert W. Auxier, Joseph J. Wachter
and Albert Schuman.
BY
B. L. Zangwill
ATTORNEY Patented Feb. 18, 1947

2,416,137

UNITED STATES PATENT OFFICE 2,416,137

BAG MOLDING

Robert W. Auxier, Joseph J. Wachter, and Albert Schuman, Wilkinsburg, Pa., assignors to Westinghouse Electric Corporation, East Pittsburgh, Pa., a corporation of Pennsylvania Application November 13, 1943, Serial No. 510,140

3 Claims. (Cl. 144—281)

Our invention generally relates to the treatment of materials, or the equivalent, with heat and pressure for mold-shaping to a desired or required configuration; and more specifically relates to bag-molding.

In the practice of bag-molding, the work-material to be set, seasoned, cured, joined, or otherwise treated, in order to alter either its physical or chemical characteristics or both, is attached and fashioned, as closely as is expedient, to a mold. This assembly, comprising the material and the mold, is then gas-tightly sealed inside a fluid- or gas-tight, flexible or elastic bag, usually made of rubber or similar material; the bag generally being larger than the assembly and loosely enveloping it.

The bag is made to conform to the shape of the assembly, a preferred method being to evacuate the bag so that it collapses around the assembly, this evacuation sometimes also causing the material to shape more closely to the mold. During this stage, bag-portions may be pulled or straightened so as to lie smoothly and without wrinkles, as far as is practical, on the material to be treated inside the bag. After the bag has been so evacuated, the bag is gas-tightly sealed, with the assembly therein, and is subjected to heat and pressure, generally, but not always, applied simultaneously, until the particular treatment desired is effected. The heat is applied to the outside of the bag by some hot fluid, such as, for example, steam or hot water; and the pressure may be applied by the same fluid supplied under pressure, or by air under pressure, or both. Particular bag-molding treatments of this general class are disclosed in greater detail in United States Patent No. 2,276,004, issued March 10, 1942, to E. L. Vidal et al.; but our invention is not limited to the disclosed means and methods.

It is a general object of our invention to provide improved means for and methods of bag-molding.

It is another object of our invention to provide a means for effecting, during a bag-molding process, a more rapid and a more uniform heating of the dielectric material being treated.

It is another object of our invention to eliminate the necessity for a source of heated fluid for heating the assembly inside the bag.

Another object of our invention is to heat a material on the mold without significantly heating the outer enveloping bag, thereby greatly increasing the life of the bag.

It is an object of our invention to heat-treat the material uniformly throughout with heat supplied at the inner side of the material, as well as the outer side.

An important object of our invention resides in uniformly heating the material with high-frequency electric currents induced throughout the material.

Other objects, features, innovations, combinations, elements and methods introduced by our invention will be discernible from the following description thereof, which is to be taken in conjunction with the accompanying drawing thereof which symbolically represents a preferred form of our invention.

The figures in the accompanying drawing are not to scale. In the drawing.

Figure 1:
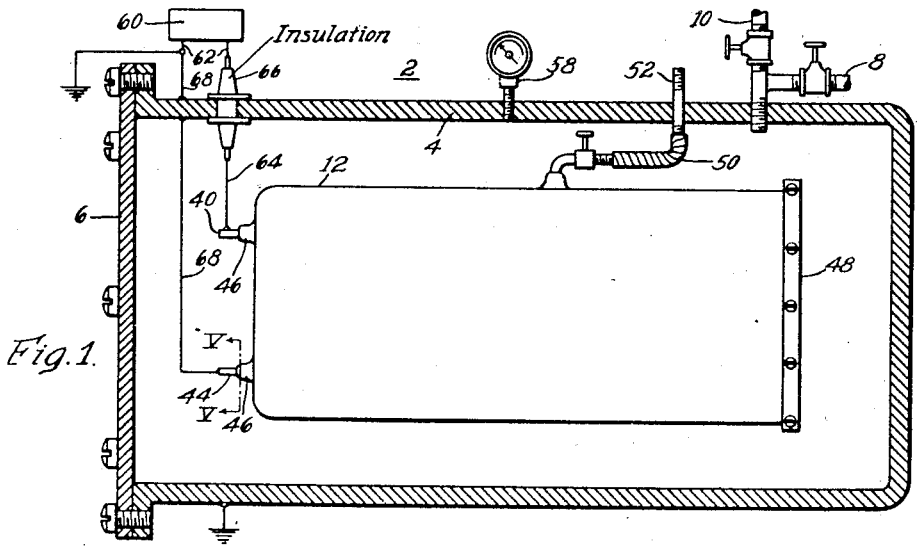
Figure 1 is a sectional view of an apparatus embodying a preferred form of our invention.

Referring initially to Figure 1, a metal pressure chamber 2, hereinafter referred to as an autoclave, comprises a pressure-resisting outer container 4 to which may be securely and detachably fastened a pressure-resisting closure 6. The autoclave 2 is provided with a controlled inlet-pipe 8, through which air under pressure can be controllably admitted to the inside of the autoclave; and with a controlled outlet-pipe 10, through which such air can be controllably exhausted from inside the autoclave. Within the autoclave a rubber bag 12 is supported in any suitable manner. Sealed within the bag 12 is an assembly comprising the mold and material of a type capable of being treated with heat and pressure so as to assume the shape of a part of the mold.

Figure 2:
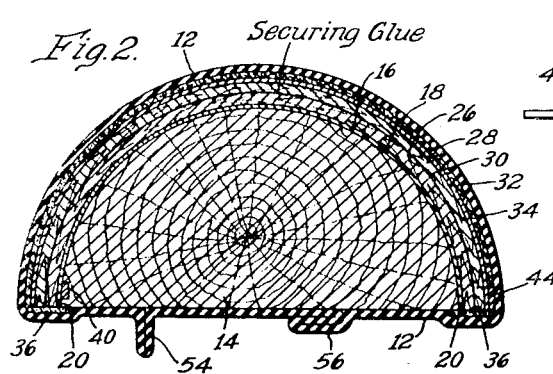
Fig. 2 is a cross-sectional view transversely through a bag, under pressure, containing an assembly of a mold and material thereon, in accordance with our invention.
Figure 3:
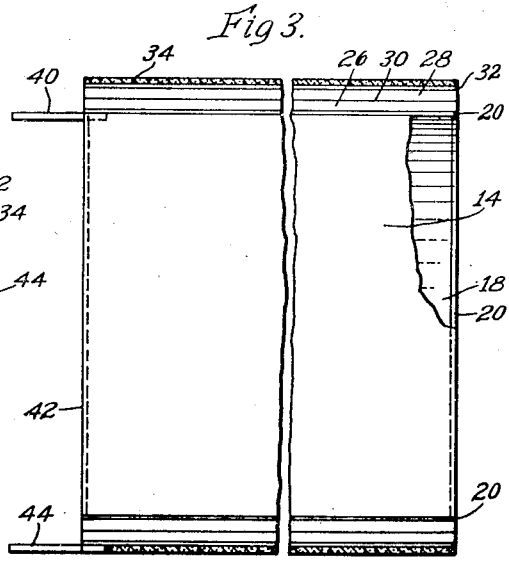
Fig. 3 is a view, partly in section, looking at the bottom of the mold with the material thereon.
Figure 4:
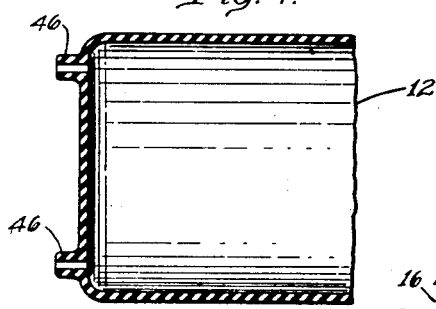
Fig. 4 is a sectional view of a part of a novel bag of our invention.
Figure 5:
Fig. 5 is a sectional view substantially on the line V—V of Fig. 1.
Figure 6:
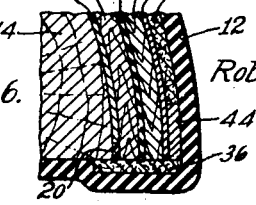
Fig. 6 is an enlarged view of part of Fig. 2, for more clearly showing the general relation of the parts.

Referring to Figs. 2 and 3, the mold comprises a solid semicylindrical pattern 14 of wood or any other suitable material, preferably one which is an electrical insulator, having a curved surface 16 to which the material to be thermoplastically treated is to be made to conform. The pattern-surface 16 comprises an electrode 18 comprising the entire curved top of the mold, except for slight peripheral clearances. An electrical insulator 20 such as a strap of wood or a plaster filler may be used at the edges of the electrode 18, filling the clearances, so that pattern-surface 16 will be continuous and smoothly curved. For relatively higher temperature, relatively long-cycle processes, heat-insulating material may be provided between the pattern 14 and the electrode 18, or the pattern made of refractory. The electrode 18 may be either rigid material or metal foil attached in any suitable manner to the pattern 14, and can be as thin as several thousandths of an inch when the material is to be treated with a high-frequency in the order of megacycles. If desired the mold may be provided with a shallow seat for the electrode 18.

The material to be treated has been shown as comprising an inner layer 26 of wood and an outer layer 28 of wood having securing glue 30 therebetween which is to be heated under pressure for bonding the layers of wood into a single plywood board. Only two wood-layers are shown in the drawing for the sake of simplicity, but obviously a greater number may be used. The outside of the outer layer of the material to be treated, in this case the outside of the outer wood layer 28, is covered with a metal electrode 32 over which is disposed heat insulation 34 preferably having turned edges 36 covering the straight axial edges of the material. Any suitable bands may be provided on the outside of the electrode 32 or the heat insulation 34 for preliminary attaching and fashioning of the material and electrode to the mold-surface 16.

The pattern 14 is provided with a short shallow groove for receiving a relatively short, narrow, rigid conductor or lug 40 which projects a short distance beyond an end 42 of the pattern, this conductor being conductively connected to the electrode 18 by being in direct physical contact therewith. A relatively short, narrow, rigid conductor or lug 44 is conductively attached to the electrode 32, this conductor also projecting a short distance beyond the end 42 of the pattern. The conductors 40 and 44 are preferably diametrically opposite one another to provide the maximum insulating space therebetween. The closed end of the bag 12 is provided with a pair of suitably spaced sleeve-like extensions or nipples 46 which snugly and relatively gas-tightly fit the projecting ends of the conductors 40 and 44 when the mold-assembly, comprising the mold, the material to be treated, the outer electrode and the heat insulation 34, are sealed inside the bag. Any suitable clamping-means 48 gas-tightly closes the open end of the bag 12 in any customary manner, after the mold-assembly is properly inserted therein; and if desired, hose clamps may be placed around the extension or nipples 46 for tightening them around the conductors 40 and 44.

The bag 12 is provided with an outlet-valve to which is connected a flexible hose 50 connectible to a pipe 52 passing through the autoclave 2 and, in turn, connected to an exhausting means for maintaining a vacuum inside the bag, although the bag is frequently initially exhausted, to an appreciable extent if desired, before being inserted inside the autoclave 2.

While the sealed bag is being exhausted, it may tend to wrinkle along the outside of the mold-assembly so that it has been customary to pull bag-portions for gathering surplus bag material at portions of the mold which do not have material thereon, as indicated by the folds 54 and 56 which are at the flat bottom of the mold. However, with our invention, folds taking up the overlapping bag-portions can remain over mold-portions on which material to be treated is directly disposed, because the bag is not called upon to transmit heat through it.

After the sealed bag has been exhausted and the autoclave closed, air under pressure may be supplied through the pipe 8, the air pressure inside the autoclave being indicated on a pressure gauge 58. This air-pressure acts on the outside of the bag, which is pressure-transmitting, so that the assembly on the mold tends toward close conformity to the mold-surface formed by the inner electrode 18, and may actually conform thereto before heat is applied.

For heating the material on the mold, the conductors 40 and 44 are connected to a suitable source of high-frequency, such as a tube-oscillator generator 60. The connections are shown in schematic form in the drawing as comprising a transmission line 62 having a high-voltage conductor 64 passing through an insulating bushing 66 in a wall of the autoclave, and a grounded conductor 68, passing through the autoclave 2, the conductors 64 and 68 being respectively connected to the conductors 40 and 44. The oscillator and its connection to the conductors 40 and 44 have been shown only schematically since the exact form in which the alternating-current energy is generated or in which it is connected to the conductors is not a specific part of our invention. In general, however, for treating plywood, frequencies of 5–50 megacycles are satisfactory, but such frequencies are by no means limiting values.

Preferably, the inner electrode 18 is at high potential with respect to the ground and hence to the metallic autoclave 2, when connected to the energizing source, the outer electrode 32 preferably being grounded. When the energy is applied to the conductors 40 and 44, a high-frequency voltage exists across the electrodes 18 and 32 so that the material, comprising the wood layers 26 and 28 and the binding glue 30, is heated by the dielectric losses therein. It has been found that by heating only the material without significantly heating the mold or bag, the material is more quickly and uniformly treated. The relatively cool bag 12 has a longer life because it is not required to transmit heat through it, as is necessary in prior bag-molding practices. The added heat insulation 34 further protects the bag from direct contact with the outer electrode 32 which may become warm or hot, but such heat insulation 34 optionally may be omitted.

While we have described air under pressure as the fluid by which the material is maintained against the mold, it is obvious that any other fluid may be used, either hot so as to augment the high-frequency electric heating, or cold so as to exert only a pressure action in the treatment, in which case the heating is due entirely to the electric heating in the material. A distinct feature of our invention resides in the fact that a cold pressure-exerting fluid can be used alone.

The electrode 32 can be made relatively rigid if desired, especially if a large quantity of formed shapes are to be successively produced; but the electrode can also be made of thin flexible metal foil, or overlapping strips of metal or metal foil, so as to more readily follow the shape of the outer side of the material on which it is placed, as the two are fashioned toward or force-pressed to the mold-shape.

While we have described our invention as applied in a preferred manner, it is obvious that many alterations may be made therein, and other patentably equivalent expedients can be used within the spirit and teachings of our invention. For example, instead of plywood, the material may be any so called "plastic" or impregnated paper or fibrous material which require heat and pressure for treatment.

We claim as our invention:

1. Means for treating a material with heat and pressure, comprising: a mold-means having a molding surface for molding a material responsive to heat and pressure; at least two electrically relatively insulated electrode-means between which the material is received; container-means enveloping said mold-means and the electrode-means with the material therebetween, said container-means comprising a flexible pressure-transmitting membrane; metallic autoclave-means enveloping said container-means, for causing a fluid supplied under pressure to press on the outer side of said container-means, including said membrane, for causing the material to tend to closely conform to said molding surface; a bushing in a wall of said autoclave-means; power-conductor means, comprising an insulated portion passing through said bushing, connected to one of said electrode-means, and a second portion electrically connected to said autoclave-means and to the other of said electrode-means.

2. Means for treating a material with heat and pressure, comprising: an assembly including a mold having a surface for receiving a material responsive to heat and pressure, said mold comprising a metallic-portion at said surface, an electrode-means for the other side of the material, said electrode-means and said metallic-portion being in insulated relation when the material is provided therebetween, and an electricity-insulating pressure-transmitting membrane on the outside of said electrode-means; metallic autoclave-means enveloping said assembly for causing a fluid supplied under pressure to act on said membrane, whereby the pressure is transmitted through said electrode-means to the material on said surface so that the material tends to conform closely to the configuration of said surface; and electricity power-transmitting means for applying a source of high-frequency electrical power directly across said metallic-portion and said electrode-means for heating the material therebetween, said power-transmitting means comprising a connection passing through said membrane, said connection being electrically directly connected to said autoclave-means and said electrode-means.

3. Means for treating a material with heat and pressure, comprising: a mold-means having a molding surface for molding a material responsive to heat and pressure; at least two electrically relatively insulated electrode-means between which the material is received; container-means enveloping said mold-means and the electrode-means with the material therebetween, said container-means comprising a flexible pressure transmitting membrane; metallic autoclave-means enveloping said container-means, for causing a fluid supplied under pressure to press on the outer side of said container-means, including said membrane, for causing the material to tend to closely conform to said molding surface; power-conductor means comprising a first conductor-portion passing through an opening in a wall of said autoclave-means and a second conductor-portion, said first conductor-portion being connected to one of said electrode-means; means closing said opening and insulating said first conductor-portion from said wall; and means connecting said second conductor-portion to said autoclave-means and to the other of said electrode-means.

ROBERT W. AUXIER.
JOSEPH J. WACHTER.
ALBERT SCHUMAN.

REFERENCES CITED

The following references are of record in the file of this patent:

UNITED STATES PATENTS

| Number | Name | Date |
|---|---|---|
| 2,073,290 | Teague | Mar. 9, 1937 |
| 2,087,480 | Pitman | July 20, 1937 |
| 2,276,004 | Vidal | Mar. 10, 1942 |
| 2,331,296 | Bendix | Oct. 12, 1943 |
| 2,109,323 | Smith | Feb. 22, 1938 |
| 2,231,457 | Stephen | Feb. 11, 1941 |
| 2,337,250 | Klassen | Dec. 21, 1943 |